(No Model.)
D. R. VIVION.
CORN PLANTER.
No. 589,321. Patented Aug. 31, 1897.
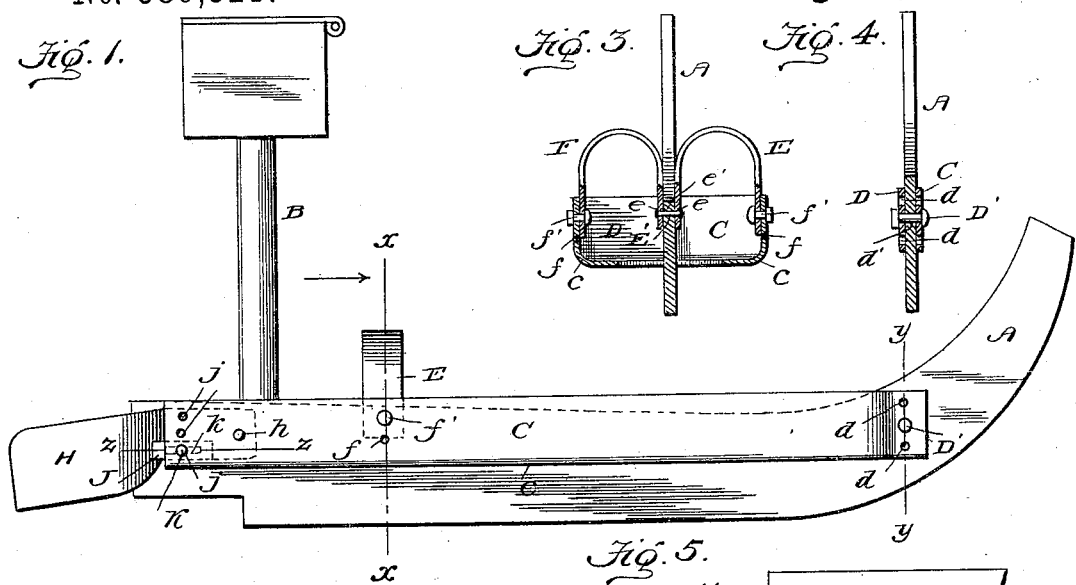
Witnesses:
Wm. C. Dashiell
H. J. Bernhard
David R. Vivion — Inventor —
By Edson Bros., Att'ys.

UNITED STATES PATENT OFFICE.

DAVID R. VIVION, OF COLUMBIA, MISSOURI.

CORN-PLANTER.

SPECIFICATION forming part of Letters Patent No. 589,321, dated August 31, 1897.

Application filed October 29, 1896. Serial No. 610,497. (No model.)

*To all whom it may concern:*

Be it known that I, DAVID R. VIVION, a citizen of the United States, residing at Columbia, in the county of Boone and State of Missouri, have invented certain new and useful Improvements in Corn-Planters; and I do hereby declare the following to be a full, clear, and exact description of the invention, such as will enable others skilled in the art to which it appertains to make and use the same.

The present invention is more particularly designed as an improvement on the gage and coverer for corn-planters disclosed in my prior United States patent, No. 374,218, bearing date of December 6, 1887.

The objects that I have in view in the present improvement are, first, to provide an improved form of the gage which regulates the depth of planting the corn in the hill; second, to make the covering-hoes adjustable laterally with respect to each other or in and out toward the line of planting, and, thirdly, to simplify the construction as well as render it strong and durable, efficient in service, easily applicable to any style of corn planter, cutter, or opener, and cheap of manufacture.

With these ends in view my improvements consist in the novel construction and combination of parts which will be hereinafter fully described and claimed.

To enable others to understand my invention, I have illustrated the same in the accompanying drawings, forming a part of this specification, and in which—

Figure 1 is a side elevation showing my attachments applied to one style of furrow cutter or opener of a corn-planter. Fig. 2 is a plan view of the same. Fig. 3 is a vertical transverse sectional view on the plane indicated by the dotted line $x\,x$ of Fig. 1. Fig. 4 is a transverse sectional view on the plane indicated by the dotted line $y\,y$ of Fig. 1. Fig. 5 is a detail horizontal sectional view on the plane indicated by the dotted line $z\,z$ of Fig. 1. Fig. 6 is a vertical transverse sectional view similar to Fig. 4, showing a modified construction of the devices for holding the gage-plates in position; and Fig. 7 is a detail perspective view of the gage-plate holder.

Like letters of reference denote corresponding parts in all the figures of the drawings.

A designates the ordinary furrow cutter or opener, which is forked at its rear end, as at $a$, and B is the seed-tube that leads from a hopper (not shown) and which has its lower end arranged to deliver the seed into the forked lower end of the cutter or opener A. These parts may be of the common construction used on corn-planters, and do not form any part of the present invention.

C D are the gage-plates that regulate the depth of penetration of the cutter or opener A and which determine the depth of planting the seed-corn in the ground, and these plates also serve the purpose of deflecting or throwing away from the hills of corn all clods of earth to prepare the ground so that it can be cultivated close up to the small corn. The gage-plates are situated on opposite sides of the opener or cutter A, and they are arranged in inclined positions relatively thereto, the angle of both gage-plates to the opener A being the same.

The improved gage-plates are each made of a single piece of metal with an inturned rounded edge $c$ at its lower side, and the gage-plates are thus adapted to ride upon the ground and to slide easily and freely over the same. By making the gage-plate with the inturned rounded flange $c$ a good bearing-surface is provided for contact or riding upon the ground, and the gage-plates C D are thus well adapted to sustain and hold the planter and to regulate the depth of penetration into the ground of the opener or cutter A.

Each gage-plate has its front end inclined to adapt it to bear firmly against the side of the opener or cutter A, and said front of the plate has a vertical row of apertures $d$, three or more in number. A single horizontal opening $d'$ is provided in the opener or cutter A, and the plates C D are applied to the opener to bring one of the apertures in each plate in line with the opening $d'$, after which a single bolt D' is passed through the three alined openings $d\,d\,d'$ to fasten the two plates C D and the opener A together. It is obvious that the plates C D can have their front ends adjusted vertically on the opener or cutter A by simply removing the bolt D', then adjusting the plates C D to bring the desired hole $d$ into coincidence with the hole $d'$ and then replacing the bolt D'.

The plates C D are normally forced away from the opener A and held on the proper inclined positions relative thereto by means of two bow-shaped springs E F. Instead of arranging these springs to bear on the free rear ends of the gage-plates and between the forked rear end a of the opener and the gage-plates, as in my former patented device, I have moved the springs to a position in front of the forked end a of the opener A to enable me to fasten the inner arms of the two springs to the opener A by means of a single bolt E'. The inner perforated arms of the two springs are applied against opposite sides of the opener A to have their openings e in line with an aperture e' in the opener A, and the bolt E' is passed through these openings e e' to rigidly fasten the two springs to the opener by the single bolt E', as described. The outer arms of the bow-springs are adjustably fastened to the gage-plates to enable the latter to be raised or lowered throughout their length, as is necessary to adapt the gage-plates to properly regulate the depth of planting, and this adjustable connection between the plates and their springs is effected by providing vertical rows of openings f in the gage-plates and by the bolts f', which unite the springs and gage-plates together.

In lieu of the springs E F to force the gage-plates normally away from the furrow-opener, as well as for holding said gage-plates in position, I may employ a rigid holder of the form shown by Figs. 6 and 7 of the drawings. This holder consists of a casting L and the arms M, which are attached to the casting and the gage-plates. The cast-metal holder is of T shape, and its foot or lower extremity is broadened and forked or slotted for the purpose of fitting the holder to the furrow-opener at a point in advance of the connection of the drill-tube of said opener. This forked foot of the cast-metal holder is rigidly held on the furrow-opener by means of the set-screws l l, which are fitted in tapped openings in the forked parts of the holder, said set-screws being turned up against its upper end in a head L', at the ends of which are the angular flanges or ears l''. The vertical arms M are fastened to the gage-plates by bolts or rivets m, and the upper ends of said arms are fitted laterally against the inclined flanges of the head of the holder, said arms and the flanged head being secured together by the bolts l'.

H I are the covering blades or hoes which are attached to the rear ends of the gage-plates, one blade or hoe to each gage-plate, so that the hoes are carried by the gage-plates. These covering-hoes are curved throughout their length and they extend inwardly toward each other and toward the line of planting. The front end of each covering-hoe is pivotally and loosely attached to the inside of one gage-plate by means of the pivot-pin h, and said covering-hoe is adjustably and rigidly fastened to the gage-plate by the tapered adjusting-wedge J and the bolt K. In the gage-plate near its free rear end is a vertical series of apertures j, and in the covering-hoe at an intermediate point of its length is a single aperture j', which is adapted to coincide with either of the apertures j in the gage-plate. The adjusting-wedge has a series of apertures k, and this wedge or plate is adapted to be adjusted in a horizontal line by moving it in and out between the covering-hoe and gage-plate to bring either of its apertures into coincidence with the apertures j j' in the covering-hoe and the gage-plate, all of the parts being rigidly held together by means of the bolt K.

It will be noted that the covering-hoes can be brought closer together or moved farther apart by properly adjusting the tapered or wedge-shaped adjusting-plates between the covering-hoes and the gage-plates in order that the hoes may throw more or less dirt upon the corn after it has been deposited in the ground. It will also be observed that the gage-plates can be adjusted vertically on the opener or cutter, in which event the connection between the bowed spring and the gage-plates should be changed to suit the change in the positions of the plates, and, furthermore, the covering-hoes are also adjustable with the gage-plates to which they are attached, although the covering-hoes are adjustable vertically as well as laterally in a manner independent of the vertical adjustment of the gage-plates themselves.

Having thus fully described my invention, what I claim as new, and desire to secure by Letters Patent, is—

1. The combination with a furrow-opener having a forked shoe, and gage-plates connected at their front ends to said opener, of a holder common to both gage-plates and attached to said furrow-opener and to the gage-plates in advance of the forked shoe of said opener, as and for the purposes described.

2. The combination with a furrow-opener having a forked shoe, of a holder fastened to the opener in advance of the shoe thereof, gage-plates attached to the opener at points in front of the holder, and adjustable bars connecting the gage-plates and the holder, as and for the purposes described.

3. The combination with a furrow-opener, and gage-plates attached thereto, of a single holder attached to the furrow-opener and having a transverse head extending toward the gage-plates, and arms or bars fastened to said gage-plates and the head of the holder, as and for the purposes described.

4. The combination with a furrow-opener and gage-plates, of a cast-metal holder having a forked foot which embraces said furrow-opener and is clamped thereto, and arms attached to the gage-plates and the head of the holder, substantially as and for the purposes described.

In testimony whereof I affix my signature in presence of two witnesses.

DAVID R. VIVION.

Witnesses:
N. D. ROBNETT,
WM. A. VIVION.